(12) United States Patent
Nishizawa

(10) Patent No.: US 7,566,179 B2
(45) Date of Patent: Jul. 28, 2009

(54) LENS BARREL AND CAMERA WITH LENS BARREL

(75) Inventor: Akio Nishizawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/213,198

(22) Filed: Jun. 16, 2008

(65) Prior Publication Data

US 2008/0252975 A1    Oct. 16, 2008

Related U.S. Application Data

(63) Continuation of application No. 11/019,590, filed on Dec. 23, 2004, now abandoned.

(30) Foreign Application Priority Data

Dec. 24, 2003  (JP)  ............................. 2003-427161
Mar. 15, 2004  (JP)  ............................. 2004-072524

(51) Int. Cl.
    *G03B 17/00*    (2006.01)
    *G02B 23/16*    (2006.01)
(52) U.S. Cl. .................. 396/448; 359/511; 359/513
(58) Field of Classification Search ............... 396/349, 396/448, 452, 505, 534; 359/511, 513
    See application file for complete search history.

(56) References Cited

U.S. PATENT DOCUMENTS 5,070,348 A    12/1991   Hayakawa et al. ............ 396/26
5,374,970 A    12/1994   Satoh et al. .................. 396/29

FOREIGN PATENT DOCUMENTS

JP    05-019331       1/1993
JP    05-173240       7/1993
JP    2001-215559     8/2001

OTHER PUBLICATIONS

U.S. Appl. No. 11/019,590, filed Dec. 23, 2004, Akio Nishizawa, Nikon Corporation.

*Primary Examiner*—Rochelle-Ann J Blackman

(57) ABSTRACT

A lens barrier is opened/closed by a barrier drive cylinder disposed on an outer peripheral side of a lens. The barrier drive cylinder is rotated by a rotation of a cam cylinder together with a first cylinder so as to move forward and backward. In the course of a movement of the lens from a retracted position to a shooting position, the barrier drive cylinder rotates such that a drive ring biased to an opening direction by a spring is driven into an opening direction. The barrier is, thus, opened. When the lens is moved from the shooting position to the retracted position, the operation reverse to the aforementioned is performed to close the barrier. An annular seal member is provided into the space between the barrier drive cylinder and the first cylinder so as to prevent water from entering into the barrel.

9 Claims, 17 Drawing Sheets

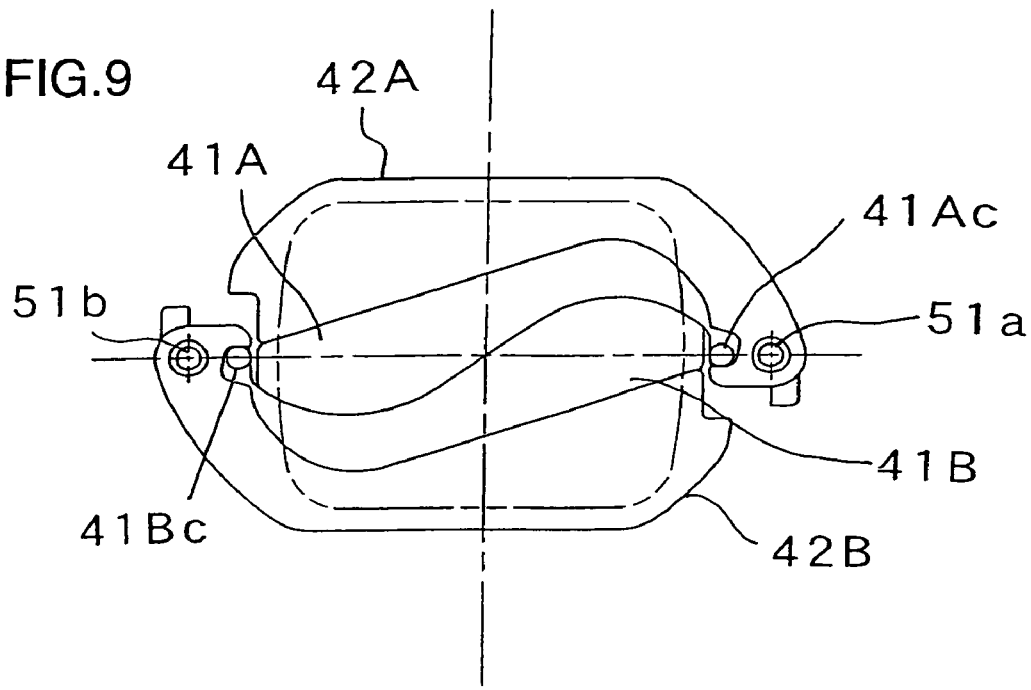
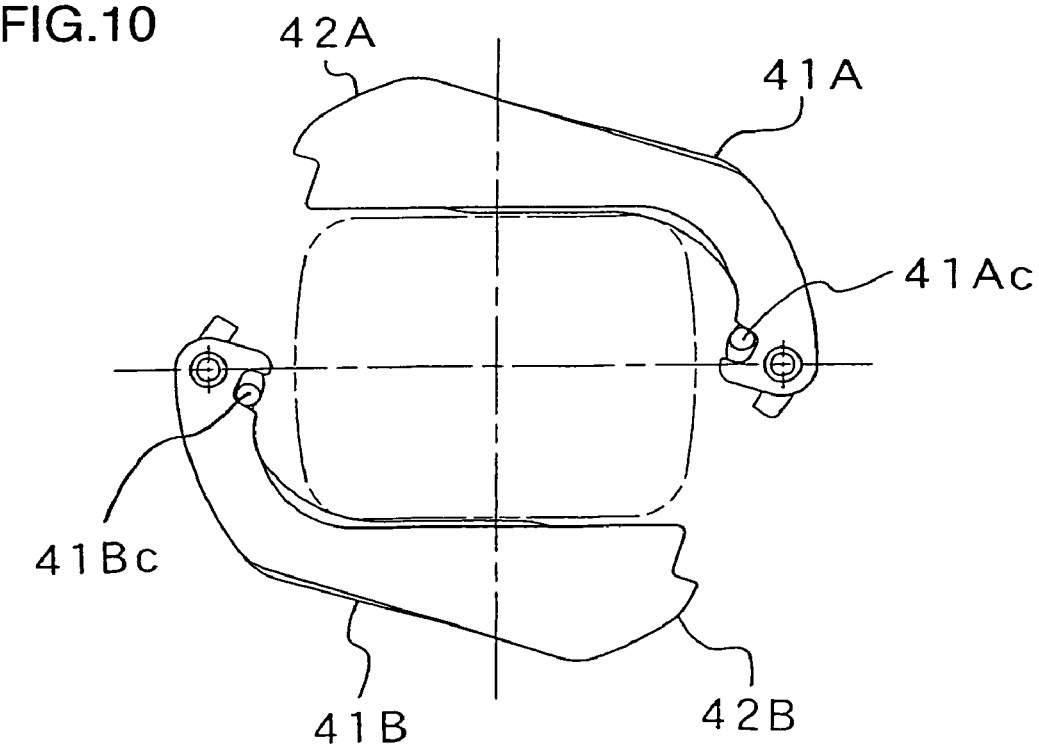

BARRIER CLOSED

BARRIER OPENED

LENS BARREL AND CAMERA WITH LENS BARREL

CROSS-REFERENCE TO RELATED APPLICATIONS

This application is a continuation of U.S. application Ser. No. 11/019,590, filed Dec. 23, 2004 now abandoned, and which further claims the benefit of priority of Japanese Patent Application Nos. 2003-427161 filed Dec. 24, 2003 and 2004-072524 filed Mar. 15, 2004, the contents of which are incorporated herein by reference.

BACKGROUND OF THE INVENTION

1. Field of the Invention

The present invention relates to a lens barrel having a lens barrier and a camera having the lens barrel, which are particularly considered to have a dust-proof/drip-proof structure.

2. Description of the Related Art

A lens-barrel that has a lens barrier which can be opened/closed at positions for exposing a photographic lens and covering its front surface respectively, has been known as disclosed in, for example, Japanese Laid-Open Patent Publications No. 2001-21559 and No. H5-19331. The lens barrier of the aforementioned lens barrel is operated by a rotating member that rotates about an optical axis.

The lens barrel is required to have a dust-proof/drip-proof structure so as to be protected from undesirable dust or droplet such that functions of various elements and an optical performance are not deteriorated. Water droplets that enter through an opening for the lens exposure in the opened state of the lens barrier tend to be accumulated in a barrier retraction space rather than being drained.

The lens barrel disclosed in each of the aforementioned publications is not provided with the dust-proof/drip-proof structure for the lens barrier and a portion around the mechanism for driving the lens barrier. The aforementioned disclosed lens barrel is not provided with the structure for discharging water that has entered into the lens barrel.

SUMMARY OF THE INVENTION

A lens barrel according to the first aspect of the invention is provided with a lens provided in a lens chamber within the lens barrel, a lens barrier that is opened and closed in front of the lens, a barrier drive cylinder provided on an outer peripheral side of the lens so as to be allowed to rotate about an optical axis relative to a member provided on an inner peripheral side of the barrier drive cylinder, a first link mechanism that rotates the barrier drive cylinder, a second link mechanism that opens and closes the lens barrier interlocking with a rotation of the barrier drive cylinder, and an annular seal member that is provided into a space between the barrier drive cylinder and the member provided on the inner peripheral side over an entire circumference.

In the case where the lens is allowed to move forward and backward along the optical axis for performing an operation of zooming or focusing, it is preferably structured such that the first link mechanism interrupts the rotation of the barrier drive cylinder when the lens moves forward and backward for performing the operation of zooming or focusing.

When the lens is allowed to move forward and backward in a range between a shooting position and a non-shooting position along the optical axis, the first link mechanism preferably rotates the barrier drive cylinder interlocking with the lens that moves forward and backward.

The first link mechanism may be structured to rotate the barrier drive cylinder only when the lens moves in a part of the range between the shooting position and the non-shooting position.

The first link mechanism may comprise a rotary cylinder that rotates about the optical axis on the outer peripheral side of the lens so as to generate a force that moves the lens and the barrier drive cylinder along the optical axis, and a straight guide member that guides the lens to move straight along the optical axis and applies a rotating force around the optical axis to the barrier drive cylinder that moves along the optical axis.

The second link mechanism may comprise a drive force generation member that generates a drive force for opening and closing the lens barrier, and a transfer mechanism that opens the lens barrier through a transfer of the drive force to the lens barrier interlocking with a rotation of the barrier drive cylinder in one direction and closes the lens barrier without the transfer of the drive force interlocking with a rotation of the barrier drive cylinder in an opposite direction. The transfer mechanism is provided closer to a front of the lens barrel than the seal member.

A lens barrel according to a second aspect of the invention is provided with lenses provided in a lens chamber within the lens barrel, a lens barrier that is opened and closed in front of the lenses, a barrier block that is provided near an inlet of the lens chamber. The barrier block is capable of holding the lens barrier in an open state and a closed state, and has a barrier retraction space in which the lens barrier in an opened state is received. As the barrier block moves along the optical axis, a volume of a rear portion of the lens chamber changes. The above-structured barrier block is provided with a drain hole which communicates the barrier retraction space with an outside of the lens barrel, and an air passage formed near the drain hole which communicates the barrier retraction space with the rear portion of the lens chamber. Accordingly an air flow directed from the rear portion of the lens chamber toward the barrier retraction space is generated in the air passage when the barrier block moves backward.

The barrier unit includes at least a part of the lenses and a holding member thereof, and a part of the air passage may be an air hole formed in the holding member.

It is preferable to dispose a metal function member within the lens barrel in the air passage so as to prevent rusting. It is preferable to seal the air passage with a gas permeable water-repellent sheet so as to prevent water from entering into the inside of the lens barrel. A plurality of the air passages formed in the barrier block makes sure to discharge air within the lens chamber to the outside.

The first and the second aspect of the invention may be combined to form the lens barrel according to the third aspect of the invention. The lens barrel according to the third aspect may employ a metal spring as the second link mechanism in the form of the barrier drive force generation member. The barrier drive force generation member may be disposed in the air passage so as to prevent rusting. The camera that contains the lens barrier according to the first to the third aspects of the invention effectively prevents water from entering thereinto, and effectively drains the water that has been entered and accumulated therein.

BRIEF DESCRIPTION OF THE DRAWINGS

FIG. 9 shows the lens barrier in a closed state viewed from a front side of the camera;

FIG. 10 is a view similar to FIG. 9 when the lens barrier is opened;

DETAILED DESCRIPTION OF THE PREFERRED EMBODIMENTS

First Embodiment

A first embodiment according to the invention will be described referring to FIGS. 1 to 12.

Figure 1:
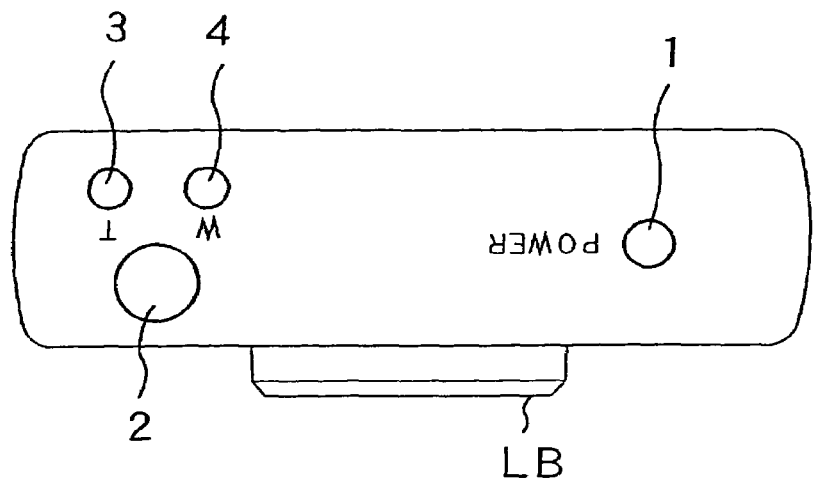
FIG. 1 is a top view of a camera according to the first embodiment.
Figure 2:
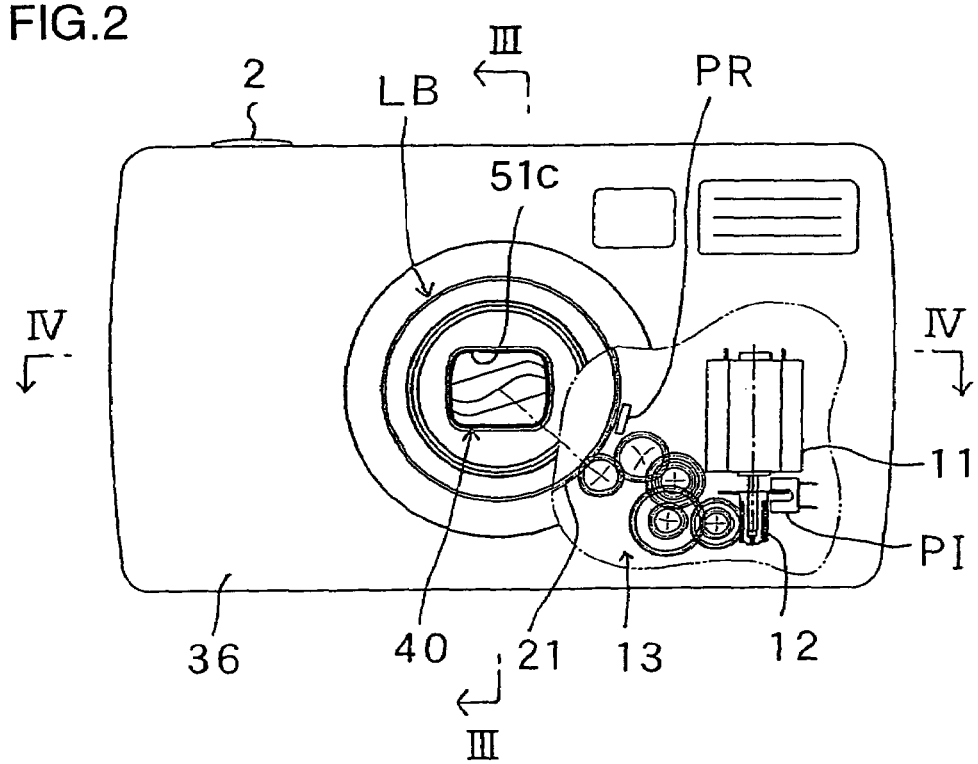
FIG. 2 is a front view of the camera as shown in FIG. 1.

FIGS. 1 and 2 respectively show a top view and a front view of a camera (digital still camera) according to the first embodiment. A power button 1, a shutter button 2, and zoom buttons 3, 4 are provided on a top surface of the camera. A zoom motor 11 is driven upon depression of the zoom button, and the resultant rotation is transferred to a cam cylinder 21 of a lens barrel LB via a worm 12 and a gear set 13. The rotation of the cam cylinder 21 allows a zooming operation. When the power is turned off, the lens barrel LB is brought into a retracted position (non-shooting position, non-photographing position). The zoom motor 11 serves as a drive source that brings the lens barrel into the retracted position and projects it into the shooting position (photographing position), respectively. Under the zoom control, an end of a reflection tape applied onto the cam cylinder 21 is detected by a photo reflector PR and a position when detecting the end of the reflection tape is set as a reference position. A rotation amount of the cam cylinder 21 from the reference position is controlled through detection of the rotation of the worm 12 by a photo interrupter PI.

The lens barrel LB incorporates a lens barrier 40 (hereinafter simply referred to as a barrier) that opens/closes in front of the lens. The detailed description with respect to the structure and the drive mechanism for the barrier 40 will be explained later. The barrier is closed by four barrier blades that cover an opening 51c for exposure of the lens such that the photographic lens is protected.

The description with respect to the lens drive mechanism, the barrier, the barrier operation mechanism, and the dripproof structure of the lens barrel LB will be explained referring to FIGS. 3 to 12 in order.

<Lens Drive Mechanism>

Figure 3:
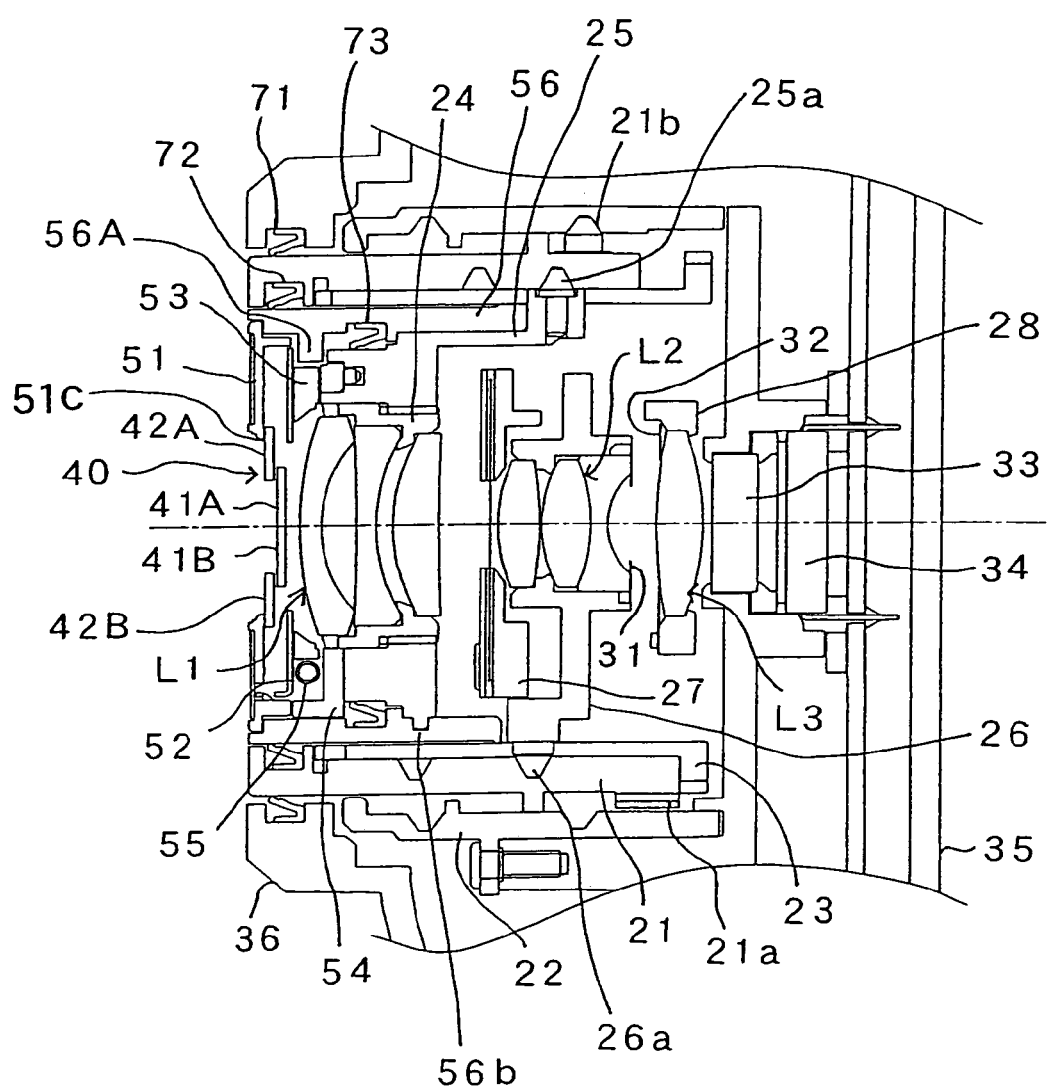
FIG. 3 is a cross sectional view of a lens barrel taken along line III-III shown in FIG. 2 when the lens barrel is closed.
Figure 4:
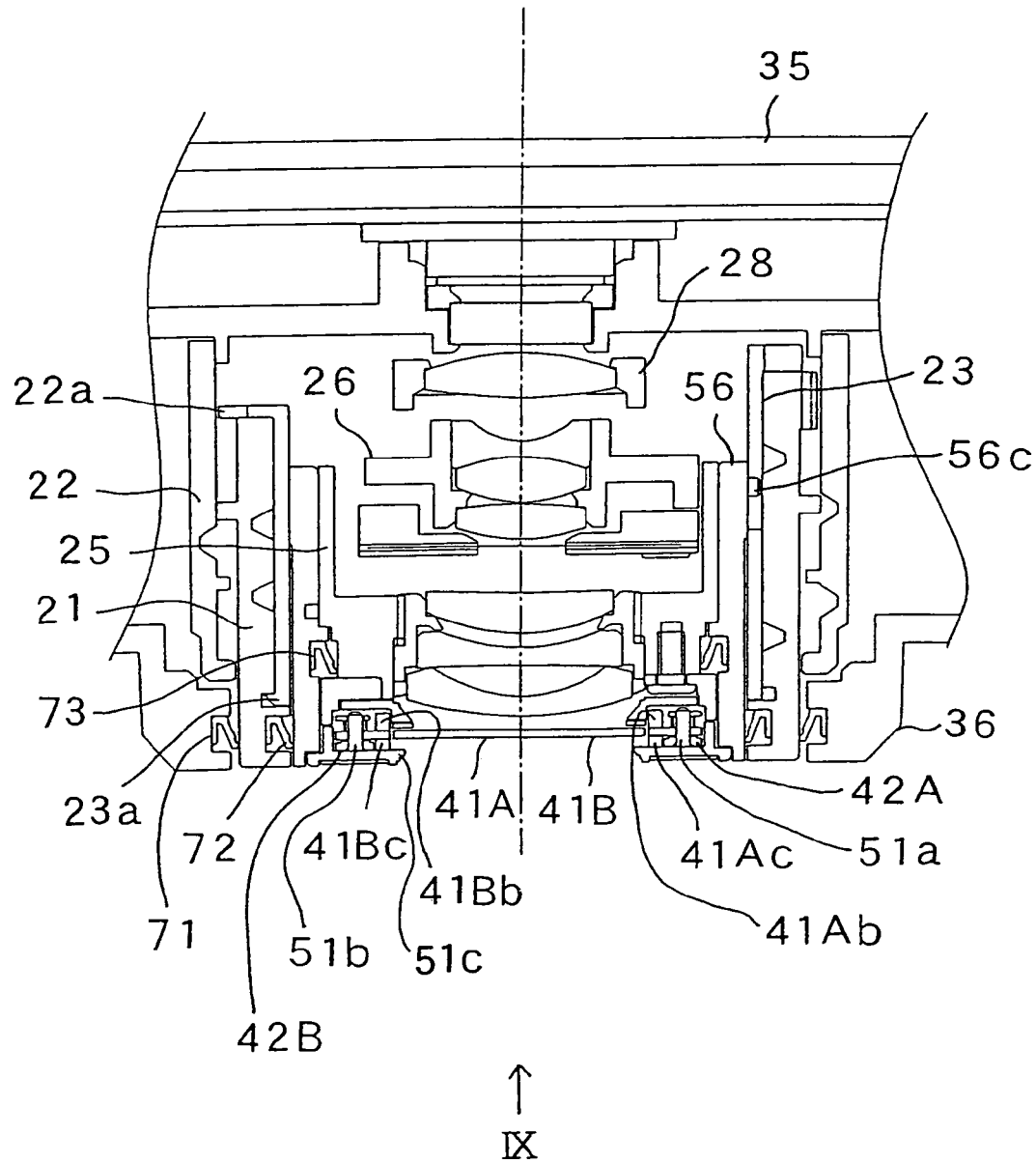
FIG. 4 is a cross sectional view of the lens barrel taken along line IV-IV shown in FIG. 2 when the lens barrel is closed.

FIGS. 3 and 4 are cross sectional views of the lens barrel LB taken along lines III-III and IV-IV shown in FIG. 2 respectively when the lens is in a retracted position. A fixed cylinder 22 that is fixed to a camera body has the cam cylinder 21 on its inner periphery. The cam cylinder 21 is rotated about an optical axis by the driving force of the zoom motor 11 that has been transferred to a gear portion 21a of the cam cylinder 21. A cam follower 21b provided on the cam cylinder 21 is engaged with a cam of the fixed cylinder 22. Accordingly the cam cylinder 21 moves backward and forward along the optical axis while rotating relative to the fixed cylinder 22, that is, the camera body.

Figure 5:
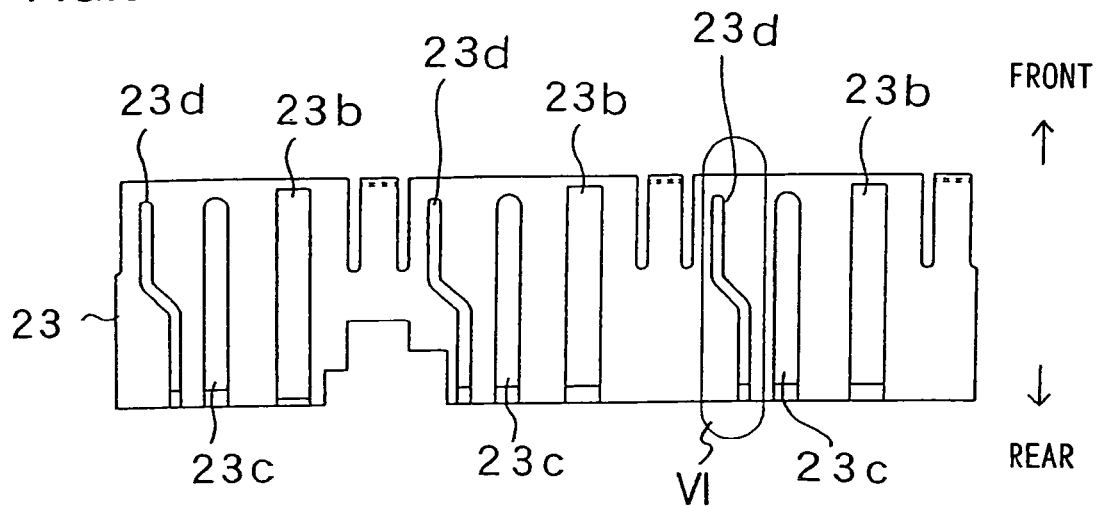
FIG. 5 is a development of a guide key.

A guide key 23 provided on the inside of the cam cylinder 21 is rotatably held at a holding portion 23a (FIG. 4) relative to the cam cylinder 21 so as to move backward and forward along the optical axis together with the cam cylinder 21. A stopper 22a of the fixed cylinder 22 prevents the rotating operation of the guide key 23. Accordingly the guide key 23 does not rotate relative to the fixed cylinder 22. As the development of FIG. 5 shows, the guide key 23 has two kinds of key grooves (straight guide grooves) along the optical axis, that is, three grooves 23b and three grooves 23c, respectively. Those grooves serve to guide first-group lenses L1 and secondgroup lenses L2 along the optical axis, respectively as later described.

The first-group lenses L1 are held by a first-group frame 24 that is pushed into a first-group cylinder 25 so as to be held. A cam follower 25a formed on the first-group cylinder 25 goes through the key groove 23b of the guide key 23 (FIG. 5) so as to be engaged with a cam groove for driving the first-group lenses of the cam cylinder 21. Accompanied with the rotation of the cam cylinder 21, the first-group cylinder 25, that is, the first-group lenses L1 are allowed to move backward and forward along the optical axis relative to the cam cylinder 21. Meanwhile the second-group lenses L2 are held by a secondgroup frame 26 together with the shutter 27. A cam follower 26a of the second-group frame 26 goes through the key groove 23c (FIG. 5) of the guide key 23 so as to be engaged with a cam groove for driving the second-group lenses of the cam cylinder 21. Accompanied with the rotation of the cam cylinder 21, the second-group lenses L2 and the shutter 27 are allowed to move backward and forward along the optical axis relative to the cam cylinder 21.

A third-group lens L3 held by a third-group frame 28 is formed as a focus lens, which is driven along the optical axis by a not-shown focus motor (stepping motor). Apertures 31, 32, an optical low pass filter 33, an image-capturing element 34 such as a CCD, a rear cover 35 of the camera, and a front cover 36 of the camera are provided.

<Barrier Structure>

Figure 7:
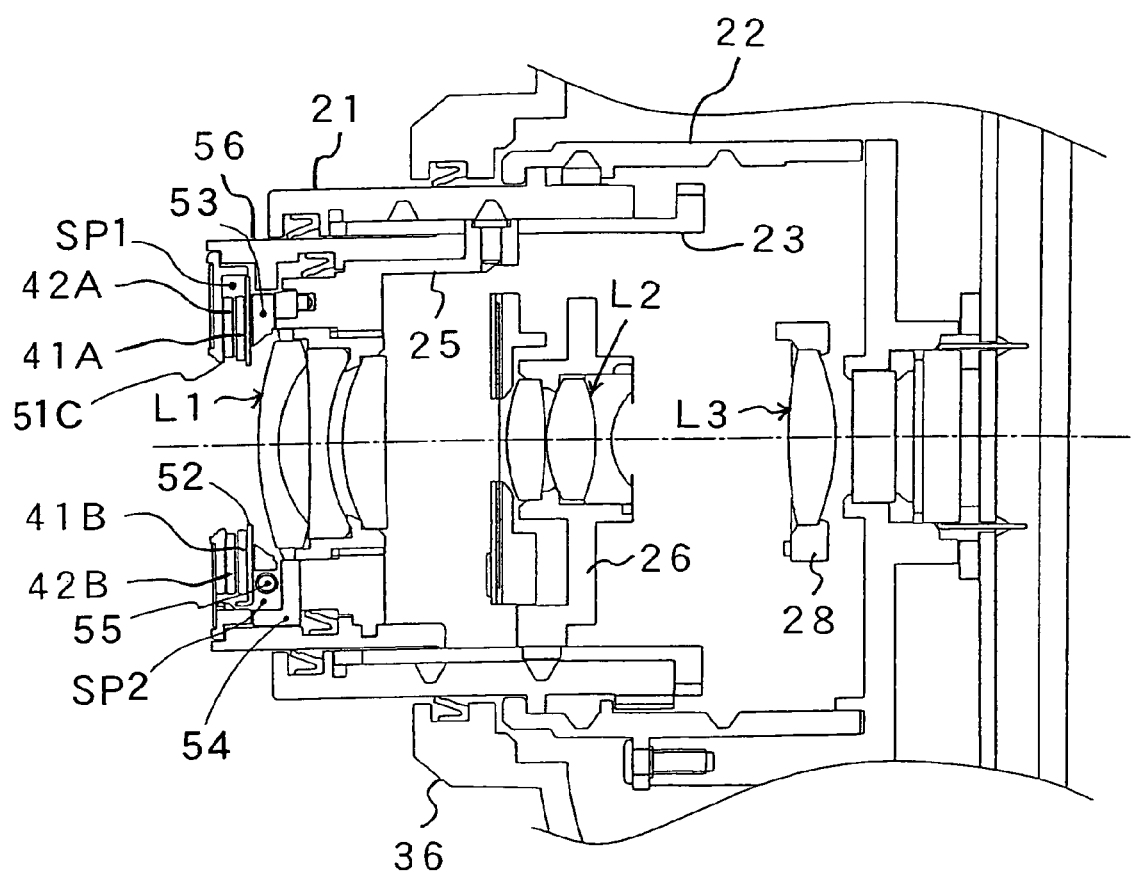
FIG. 7 is a view similar to FIG. 3 when the lens barrier is opened.

An outer barrier cover 51 attached to a leading end of the first-group cylinder 25 has an opening 51c formed therein for exposure of the lens. In case of closing the barrier, four barrier blades 41A, 41B, 42A and 42B serve to cover the opening 51c as shown in FIG. 3. In case of opening the barrier, those blades that have been released are retracted into a barrier retraction space SP1 defined by the inner and outer barrier covers 52, 51 so as to be stored overlapped therein as shown in FIG. 7.

Figure 8:
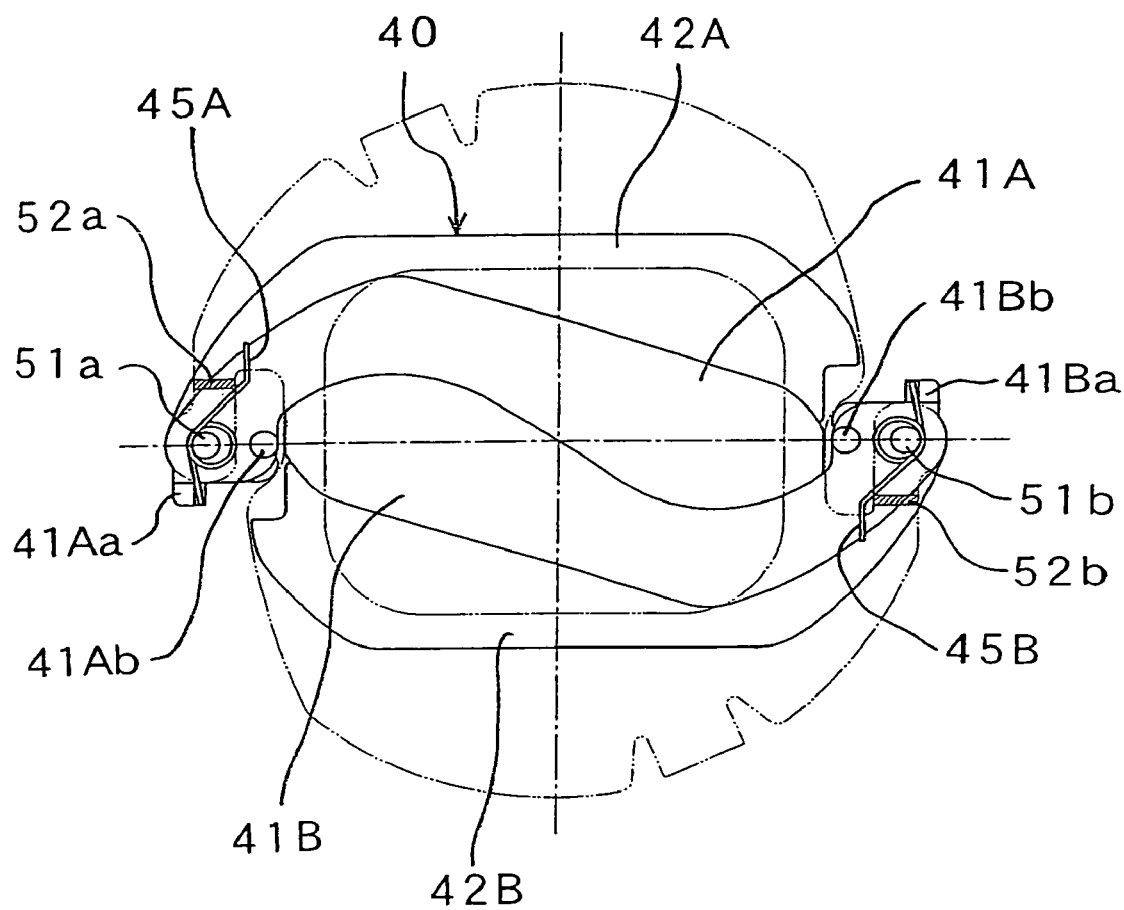
FIG. 8 shows the lens barrier viewed from a back side of the camera.

FIG. 8 shows the barrier 40 viewed from the image-capturing element, and FIGS. 9 and 10 respectively show the barrier 40 viewed from the front end of the camera in the direction IX as shown in FIG. 4. The upper barrier blades 41A, 42A are supported rotatably about an axis 51a that protrudes from the barrier cover 51. The lower barrier blades 41B, 42B are supported rotatably about an axis 51b in the same manner as aforementioned. The axes 51a and 51b are provided with blade drive springs (torsion springs) 45A, 45B, respectively. Ends of the springs 45A and 45B are respectively held at spring holding portions 41Aa and 41Ba of the respective barrier blades 41A, 41B, and the other ends are held at spring holding portions 52a, 52b of the barrier cover 52 respectively. The bias force of those springs 45A, 45B serve to bias those four barrier blades toward a barrier closing direction. When the barrier is closed, leading ends of the barrier blades 41A and 41B abut with each other. The barrier blades 42A and 42B are laid on and under the barrier blades 41A and 41B, respectively.

Back surfaces of the barrier blades 41A and 41B have blade drive shafts 41Ab and 41Bb as shown in FIG. 8 so as to protrude therefrom, respectively. Front surfaces of the barrier blades 41A and 41B have blade link shafts 41Ac and 41Bc as shown in FIG. 9 so as to protrude therefrom, respectively. In the state where the barrier is closed, when a barrier drive ring 53 (described later) rotates in a barrier opening direction so as to apply the force in the barrier opening direction to the blade drive shafts 41Ab, 41Bb, the barrier blades 41A and 41B start rotating about the shafts 51a and 51b respectively against the bias force of the springs 45A and 45B. As the barrier blades 41A and 41B move to reach a predetermined barrier opening position, the blade link shafts 41Ac and 41Bc abut on the barrier blades 42A and 42B, respectively. As a result, the barrier blades 42A and 42B start opening.

FIG. 10 shows the barrier in the state where the respective barrier blades are in fully opened positions. In the fully opened state, when the barrier drive ring 53 (described later) rotates in the barrier closing direction to interrupt the application of the drive force for opening the barrier to the blade drive shafts 41Ab and 41Bb, each bias force of the blade drive springs 45A, 45B serves to close the blade (FIGS. 8, 9). The description with respect to the barrier opening/closing operation will be described later.

<Barrier Drive Mechanism>

Figure 11:
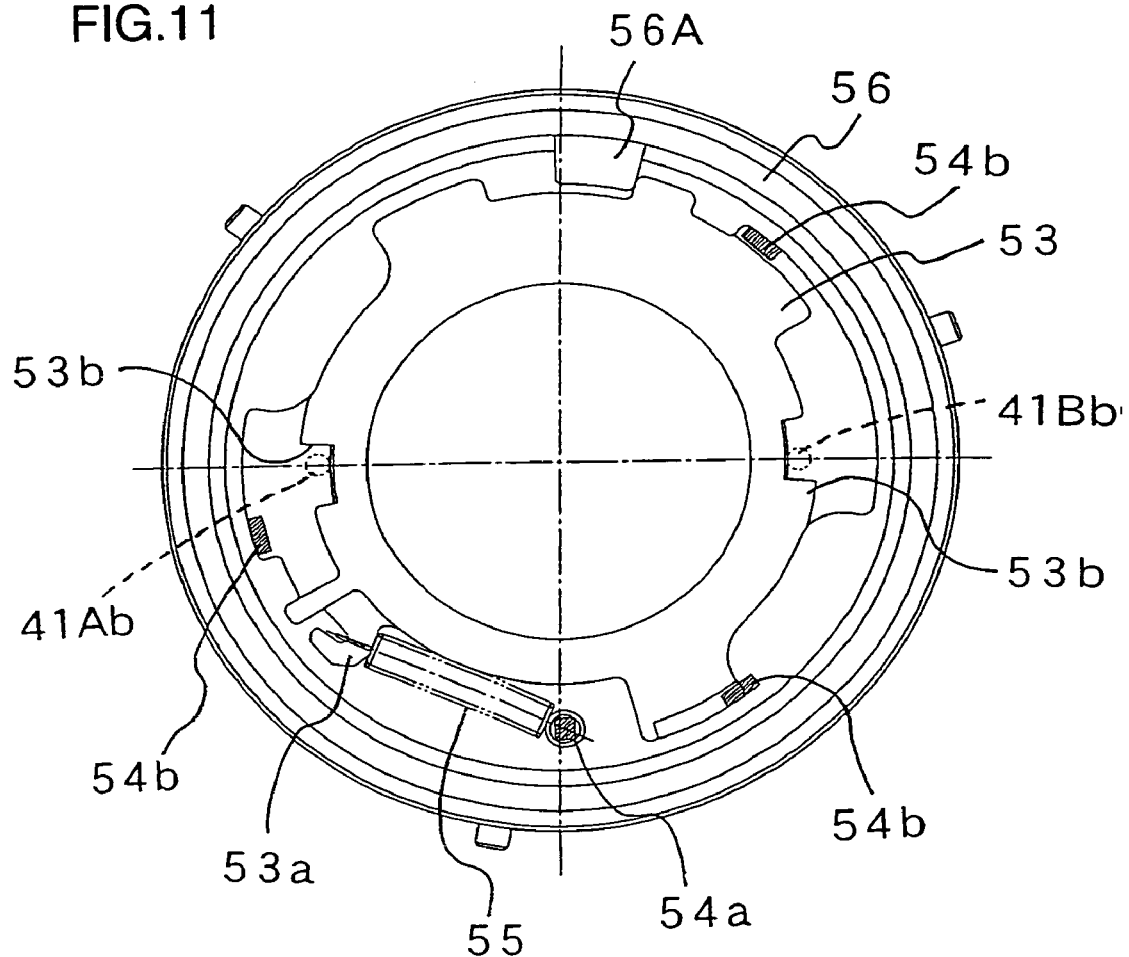
FIG. 11 is a view of a barrier drive mechanism viewed from the back side of the camera when the lens barrier is closed.

The aforementioned barrier blades are opened through transfer of the bias force of a bias spring 55 to the blade drive shafts 41Ab and 41Bb via the barrier drive ring 53 as shown in FIG. 11. The barrier drive ring 53 is joined through bayonet coupling with an engaging pawl 54b of a barrier drive ring holding member 54 as shown in FIG. 3 screwed to the first-group cylinder 25 so as to be rotatable about the optical axis relative to the barrier drive ring holding member 54. The bias spring 55 is interposed between a spring holding portion 53a of the barrier drive ring 53 and a spring holding portion 54a of the holding member 54 so as to bias the barrier drive ring 53 counterclockwise as shown in FIG. 11. The bias spring force for opening the barrier applied to the barrier drive ring 53 is blocked by a barrier drive cylinder 56 (described later) until it is required to open the barrier. When it is required to open the barrier, the barrier drive cylinder 56 is operated into a barrier opening direction such that the bias force of the bias spring 55 serves to rotate the barrier drive ring 53 in the opening direction so as to open the barrier blades.

The barrier drive ring 53 and the bias spring 55 are disposed in the space SP2 (FIG. 7) defined by the inner barrier cover 52 and the barrier drive ring holding member 54. The space SP2 will be referred to as the drive ring space.

The spring holding portion 54a and the engaging pawl 54b may be formed integrally with the first-group cylinder 25. However, if the above-described pawl-like member is integrally formed with the first-group cylinder 25, a hole has to be formed around the pawl-like member for the purpose of eliminating the undercut portion. Accordingly water is likely to enter into the lens barrel through the aforementioned hole. In the embodiment, the holding member 54 is provided with the pawl-like member so as to prevent water from entering into the front surface of the first-group cylinder 25. Then the holding member 54 is attached by screws to the first-group cylinder 25 so as to avoid formation of the hole, resulting in the improved drip-proof structure.

Figure 12:
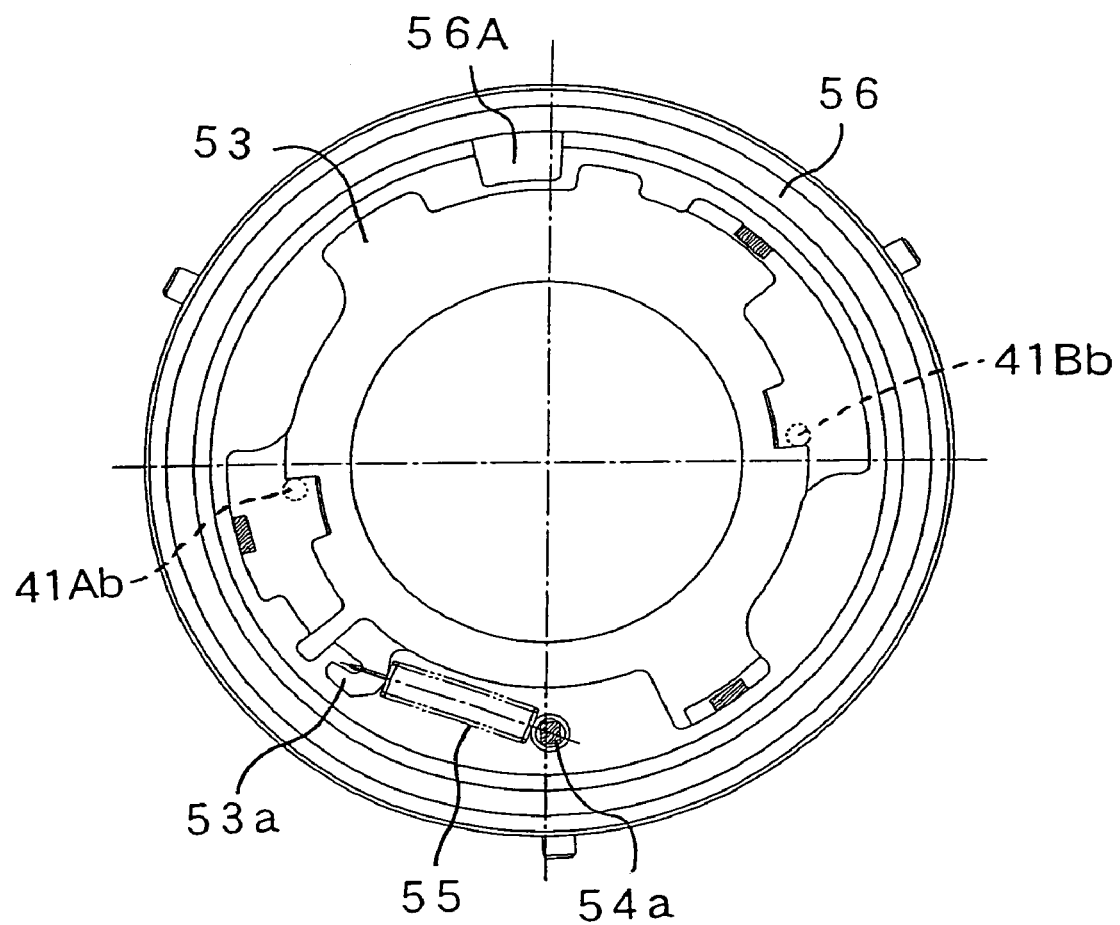
FIG. 12 is a view similar to FIG. 11 when the lens barrier is opened.
Figure 13:
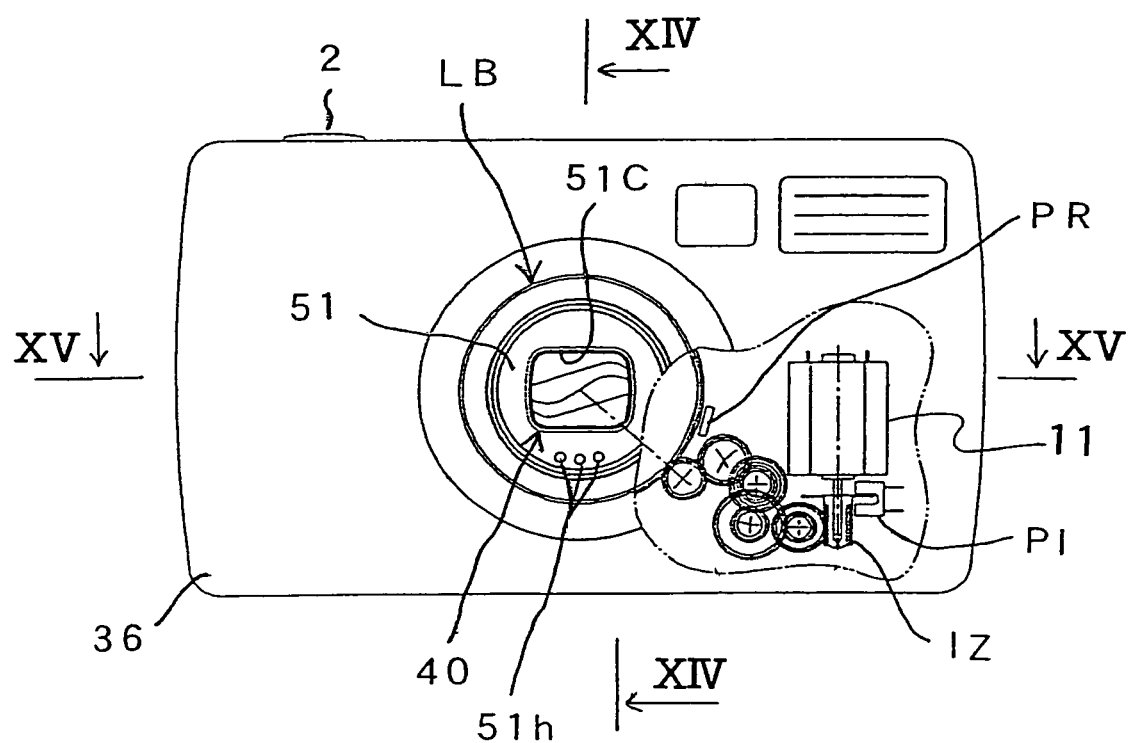
FIG. 13 is a front view of a camera according to the second embodiment.
Figure 14:
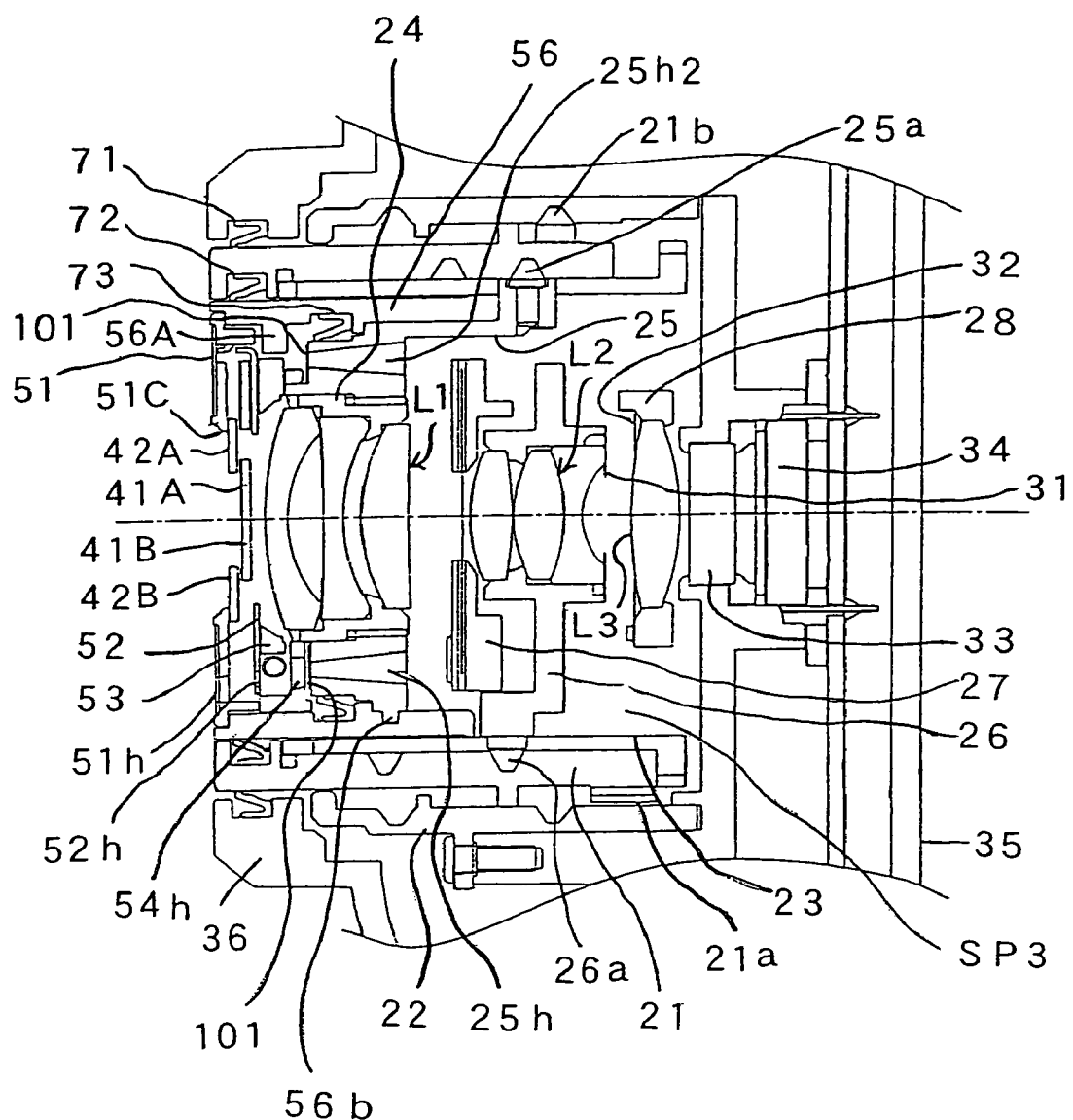
FIG. 14 is a cross sectional view of a lens barrel taken along line XIV-XIV shown in FIG. 13 when a lens barrier is closed.
Figure 15:
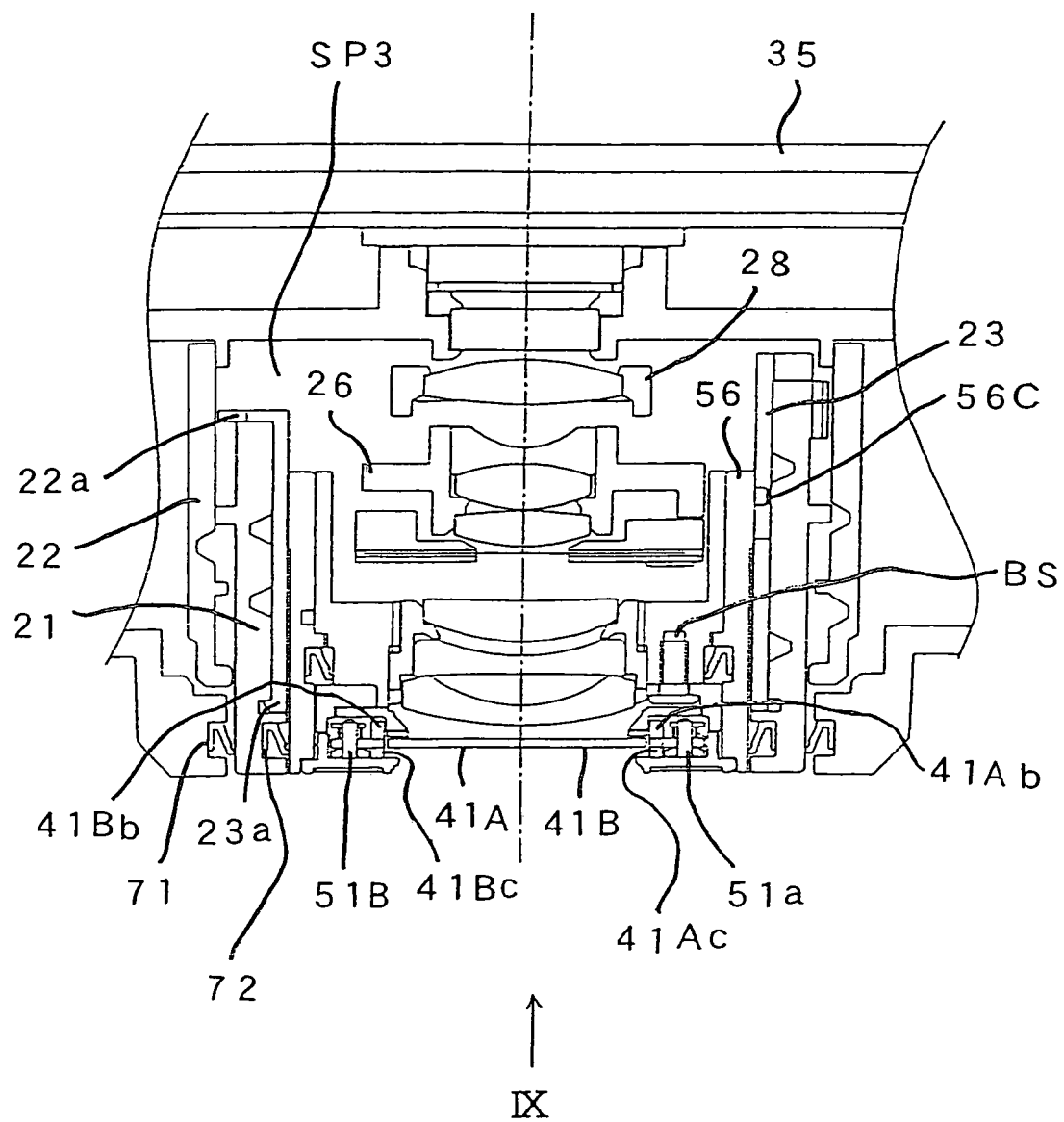
FIG. 15 is a cross sectional view of the lens barrel taken along line XV-XV shown in FIG. 13 when the lens barrier is closed.
Figure 16:
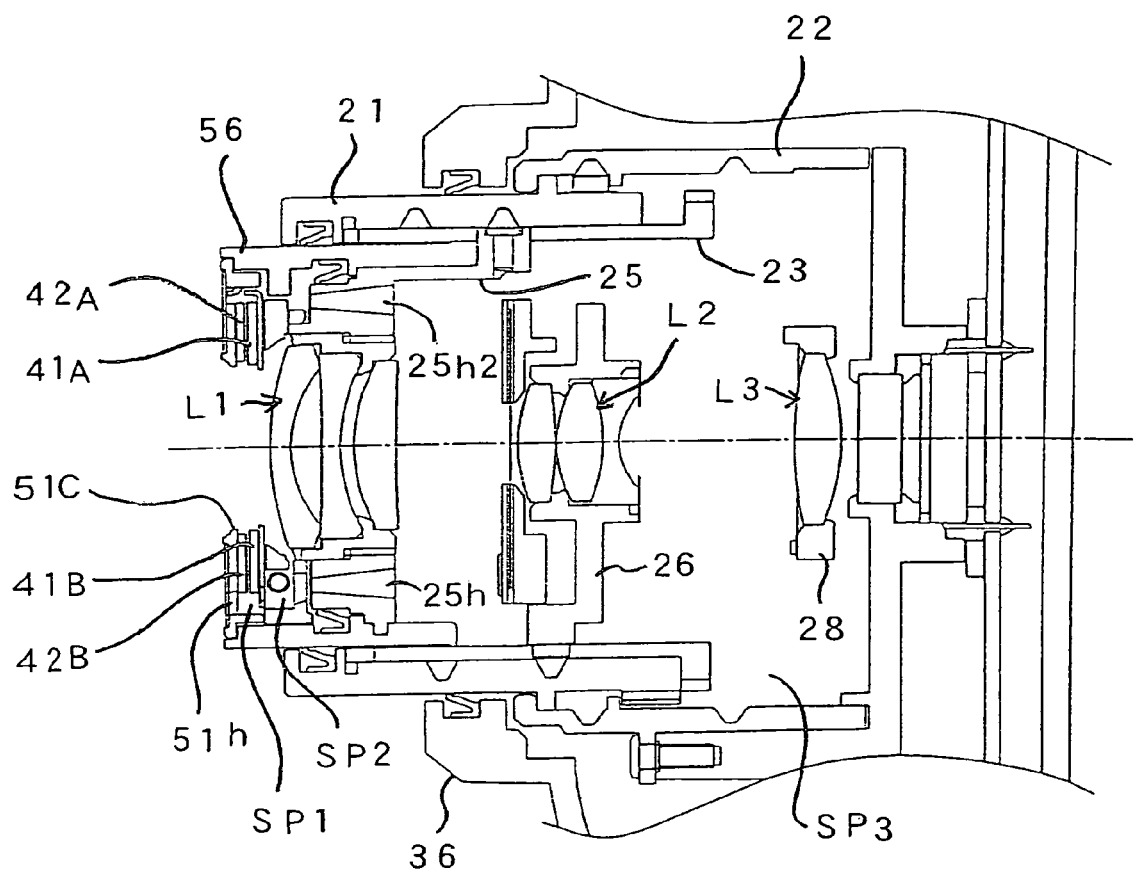
FIG. 16 is a view similar to FIG. 14 when the lens barrier is opened.
Figure 17:
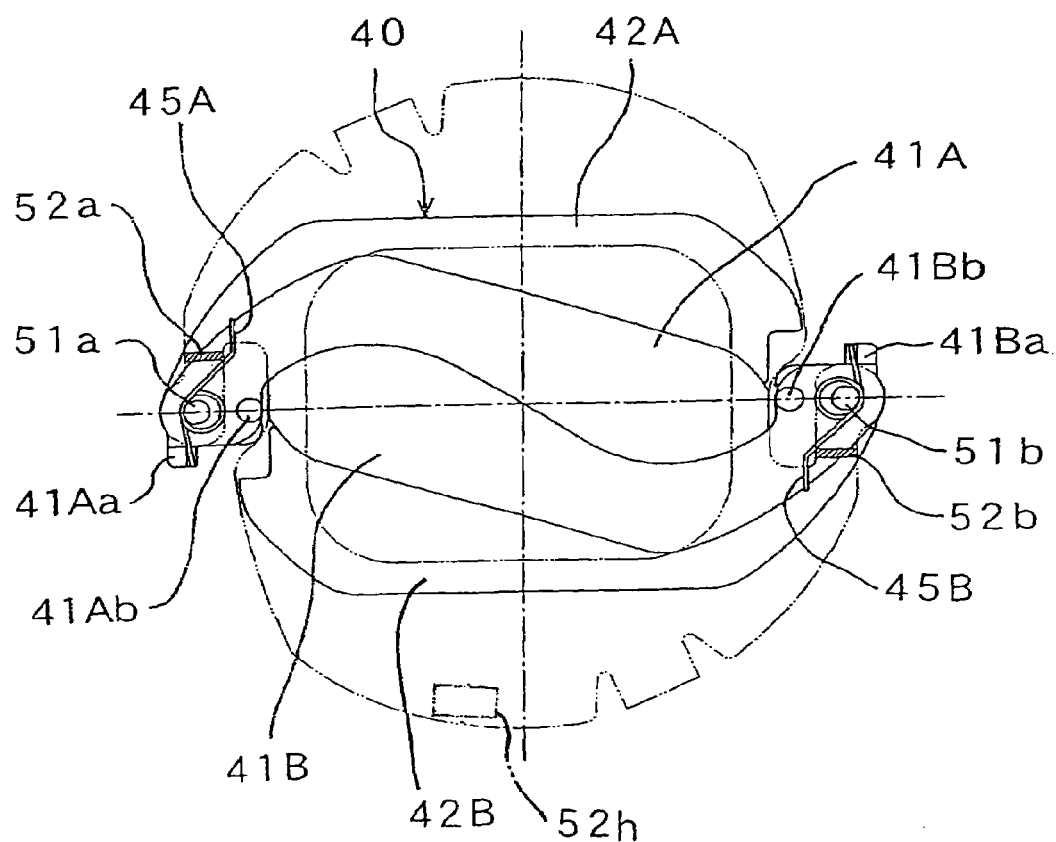
FIG. 17 shows the lens barrier viewed from the back side of the camera.

FIG. 11 shows the barrier drive ring 53 in the state where its counterclockwise rotation is interrupted by a pawl 56A of a barrier drive cylinder 56 (described later) while keeping the barrier blades closed. Accompanied with the counterclockwise rotation of the barrier drive cylinder 56 in response to the request for opening the barrier, the pawl 56A is moved counterclockwise. Accordingly the counterclockwise rotation of the barrier drive ring 53 is allowed by the bias force of the bias spring 55. The barrier drive ring 53 is provided with a pair of abutment portions 53b symmetrical with respect to the axis of the barrier drive ring 53. The counterclockwise rotation of the barrier drive ring 53 brings the pair of abutment portions 53b into abutment on the blade drive shafts 41Ab and 41Bb. The barrier blades are released by moving the blade drive shafts 41Ab and 41Bb to the position as shown in FIG. 12.

A bayonet portion 56b (FIG. 3) of the barrier drive cylinder 56 having the pawl 56A for limiting the rotation is joined through bayonet coupling with the first-group cylinder 25. Accordingly the barrier drive cylinder 56 moves along the optical axis together with the first-group cylinder 25. The barrier drive cylinder 56 is allowed to rotate relative to the first-group cylinder 25 only in a certain angular range. A cam follower 56c (FIG. 4) of the barrier drive cylinder 56 is engaged with the barrier drive cam 23d (FIGS. 5, 6) formed in the guide key 23. The cam cylinder 21 moves along the optical axis while rotating with the cam groove of the fixed cylinder 22. The guide key 23 moves along the optical axis together with the cam cylinder 21, but does not rotate relative to the fixed cylinder 22. The first-group cylinder 25 is moved accompanied with the rotation of the cam cylinder 21 along the optical axis together with the barrier drive cylinder 56. A distance of the movement of the first-group cylinder 25 along the optical axis is different from that of the cam cylinder 21. The barrier drive cylinder 56 moves along the optical axis relative to the guide key 23, which allows the barrier drive cylinder 56 to rotate upon receipt of the rotating force from the barrier drive cam 23d. The pawl 56A is driven to be moved between the position (FIG. 11) at which the rotation of the barrier drive ring 53 is interrupted and the position (FIG. 12) at which the rotation is allowed. The detailed operations will be explained later.

<Drip-proof Structure>

A ring-shaped drip-proof rubber member 71 is fit to the space defined by the front cover 36 of the camera and the cam cylinder 21 over an entire circumference. A ring-shaped drip-proof rubber member 72 is also fit to the space defined by the cam cylinder 21 and the barrier drive cylinder 56 over an entire circumference. A ring-shaped drip-proof rubber member 73 is further fit to the space defined by the barrier drive cylinder 56 and the first-group cylinder 25 over an entire circumference. An outer peripheral surface of the drip-proof rubber member 71 is bonded to the front cover 36 of the camera, and an inner peripheral surface is in contact with the outer peripheral surface of the cam cylinder 21. An outer peripheral surface of the drip-proof rubber member 72 is bonded to the cam cylinder 21, and an inner peripheral surface is in contact with an outer peripheral surface of the barrier drive cylinder 56. An outer peripheral surface of the drip-proof rubber member 73 is bonded to the barrier drive cylinder 56, and an inner peripheral surface is in contact with the outer peripheral surface of the first-group cylinder 25. That is, each of the above-described drip-proof rubber members 71 to 73 is bonded to the inner peripheral surface of each of the outer members, and in tight contact with the inner member through elastic force so as to prevent water droplets and dust from entering through the respective gaps. These drip-proof rubber members 71 to 73 serve to perform a shading function. The gap between the first-group frame 24 and the first-group cylinder 25 is sealed with the silicon.

Each of FIGS. 3, 4 and 11 represents the state where the lens barrel LB is in the retracted position, and the respective blades of the barrier 40 are closed. In the aforementioned state, the cam follower 56*c* of the barrier drive cylinder 56 is in the position designated as Pr shown in FIG. 6 relative to the barrier drive cam 23*d* of the guide key 23. When the power of the camera is turned on, the zoom motor 11 rotates, and the aforementioned function causes the cam cylinder 21 to be projected while being rotated, and the first-group cylinder 25 and the second-group frame 26 moves backward and forward relative to the cam cylinder 21.

Figure 6:
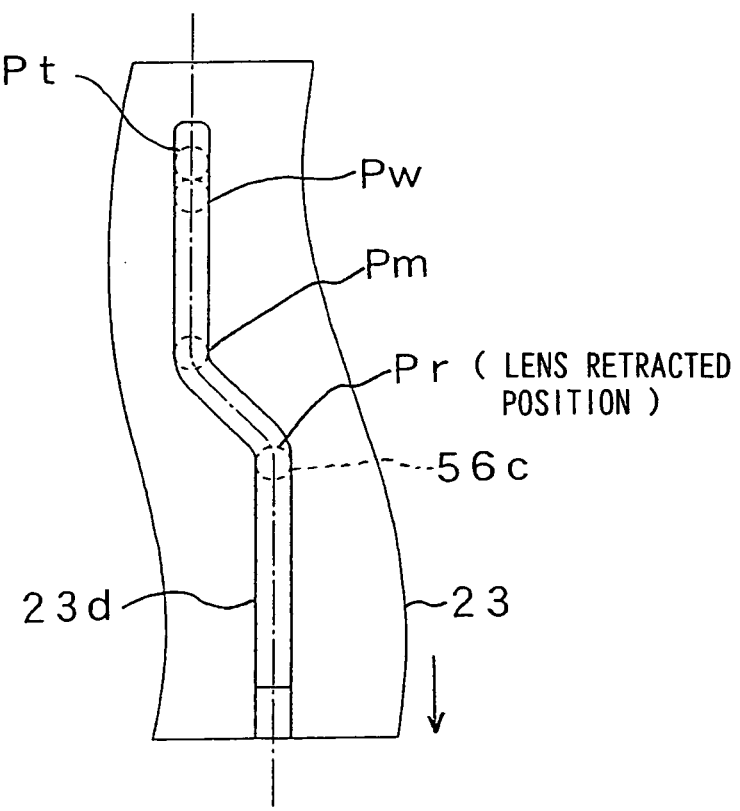
FIG. 6 is an expanded view of a portion VI shown in FIG. 5 as a barrier drive cam formed in the guide key.

The guide key 23 that moves backward and forward together with the cam cylinder 21 moves relative to the barrier drive cylinder 56, which is projected together with the first-group cylinder 25, in the arrow direction as shown in FIG. 6. Accordingly the cam follower 56*c* receives the rotating force from the cam 23*d* until it reaches the position Pm, and the barrier drive cylinder 56 rotates. This allows the pawl 56A of the barrier drive cylinder 56 to rotate counterclockwise as shown in FIG. 11, and the barrier drive ring 53 is rotated in the same direction by the bias force of the bias spring 55. As the barrier drive ring 53 rotates to a certain degree, the pair of the abutment portions 53*b* abut on the blade drive shafts 41Ab and 41Bb respectively so as to be driven. Then four barrier blades 41A, 41B, 42A and 42B are released to be stopped in abutment on the stopper at the released side, thus stopping the barrier drive ring 53. The barrier drive cylinder 56 keeps rotating even after the drive ring is stopped. It stops when the cam follower 56*c* reaches the position Pm.

The barrier blades are constantly biased toward the closing direction by the blade drive springs 45A and 45B. As the bias force of the bias spring 55 is greater than that of the blade drive springs 45A and 45B, those blades 41A, 41B, 42A and 42B are held opened.

The cam cylinder 21, guide key 23, the first-group cylinder 25 and the barrier drive cylinder 56 further move forward until the lenses L1 and L2 reach the "wide" end position. Then photographing is allowed. The cam follower 56*c* at this time is located on the position Pw. The cam follower 56*c* moves in parallel with the optical axis of the barrier drive cam 23*d* in the range between the position Pm and the position Pw. Until then, it is not influenced by the rotating force, and the barrier drive cylinder 56 does not rotate. Upon operation of the zoom buttons 3 and 4 for zooming, the first-group cylinder 25 and the second-group frame 26 move backward and forward along the optical axis. The first-group cylinder 25 once retracts toward the CCD in accordance with the zooming to a "tele" side, and then moves forward from the halfway position. The barrier drive cylinder 56 that moves together with the first-group cylinder 25 has the same movement as described above. The cam follower 56*c* moves to pass the positions Pw, Pm, Pw, and Pt ("tele" end) in this order, and moves in the reverse order in case of zooming to the "wide". Accordingly, the cam follower 56*c* is not influenced by the drive force from the barrier drive cam groove 23*d*, thus preventing the rotation of the barrier drive cylinder 56.

FIG. 7 shows the operational state in which the cam follower 56*c* is located on the position Pm (the intermediate position between the "tele" end and the "wide" end) by zooming. In this state, the degree of projection of the first-group cylinder 25 and the barrier drive cylinder 56 from the cam cylinder 21 become the smallest among those during the zooming. There may be the case where the lens barrel is brought into such state when the cam follower 56*c* reaches the "wide" end position.

When the power of the camera is turned off, the lens barrel LB is driven to the retracted position. As it approaches the retracted position, the relative movement of the barrier drive cylinder 56 that moves together with the first-group cylinder 25, and the guide key 23 that moves together with the cam cylinder 21 causes the cam follower 56*c* of the barrier drive cylinder 56 to move from the position Pm to the position Pr. Accordingly the cam follower 56*c* receives the rotating force from the cam 23*d*, and the barrier drive cylinder 56 rotates in the direction reverse to the one as aforementioned (the clockwise direction as shown in FIG. 12). The pawl 56A of the barrier drive cylinder 56 rotates the barrier drive ring 53 clockwise against the bias spring 55 so as to release the force applied to the blade drive shafts 41Ab, 41Bb for opening. Then the respective barrier blades are closed by the bias force of the blade drive springs 45A and 45B.

The drip-proof rubber member 73 that is fit between the barrier drive cylinder 56 and the first-group cylinder 25 slidably moves on the outer peripheral surface of the first-group cylinder 25 upon rotation of the barrier drive cylinder 56 such that the sliding friction force is generated. Such friction force becomes the rotational load of the barrier drive cylinder 56. The embodiment of the invention is structured so that the bias force (barrier drive force) of the bias spring 55 is transferred to the barrier 40 interlocking with the rotation of the barrier drive cylinder 56 to open the barrier 40 rather than the case where the barrier drive cylinder 56 directly drives the barrier 40. Accordingly the friction force does not function as the resistance against the bias spring 55 without giving an adverse effect to the opening operation of the barrier. The consideration with respect to the use of a large bias spring sufficient to resist the friction force does not have to be made, resulting in reduced cost and space.

The barrier drive cylinder 56 is rotated interlocking with the driving of the lens. The effect of the barrier drive cam 23*d* keeps the barrier drive cylinder 56 from rotating during the time other than that for operating the barrier. Especially at the zooming operation, it is never rotated. This makes it possible to minimize the sliding movement of the drip-proof rubber member 73, thus improving the dust-proof and drip-proof functions. As the friction force resulting from the sliding movement of the drip-proof rubber member 73 is never generated at the zooming operation, such friction force does not serve as the load of the motor. As the rotating angle of the barrier drive cylinder 56 is substantially small as shown in FIGS. 11 and 12, the consideration for avoiding the interference of the barrier drive cylinder to the peripheral members may be minimized, thus saving the space. In the structure where the barrier drive cylinder is constantly rotated when the lens is driven (including zooming) as disclosed in Japanese Laid-Open Patent Publication No. 2001-215559, the friction force of the drip-proof rubber member serves as the motor load during the zooming operation. As the rotating amount of the pawl is also increased, the consideration for avoiding the interference to the peripheral members has to be made.

The barrier drive cylinder 56 rotates upon receipt of the rotating force from the barrier drive cam 23d formed in the guide key 23. It may be structured to receive the rotating force from the cam formed in the cam cylinder 21 rather than that formed in the guide key 23. As the cam cylinder 21 has been already provided with the cam for driving two groups of lenses L1 and L2, if the cam for driving the barrier is further added, the length or the thickness of the cam cylinder 21 has to be increased depending on circumstances. Meanwhile, the guide key 23 is provided with two guide grooves 23b and 23c. As the rotating angle of the barrier drive cylinder 56 is substantially small as described above, most part of the cam 23d is straight as shown in FIGS. 5 and 6. Then the thickness or the length of the guide key 23 does not have to be increased for adding the cam 23d to the guide key 23.

As has been described above, the first-group cylinder 25 is arranged just inside of the barrier drive cylinder 56. It is inevitable to fit the drip-proof rubber member 73 to the space between the barrier drive cylinder 56 and the first-group cylinder 25. In the structure having the other member, which can rotate relatively to the barrier drive cylinder 56, between the barrier drive cylinder 56 and the first-group cylinder 25, the drip-proof rubber member 73 is fit to the space between the barrier drive cylinder 56 and the other member.

Second Embodiment

A camera that has a lens barrel according to the second embodiment will be described referring to FIGS. 13 to 19. In this embodiment, an explanation will be only made with respect to the elements different from those of the first embodiment, and the explanation of the same elements as those of the lens barrel in the first embodiment and designated with the same reference numerals, thus, will be omitted. The lens barrel according to the second embodiment is provided with a drain structure that drains water which has accidentally entered into the lens barrel.

The drain structure as the feature of the second embodiment will be described referring to FIGS. 13 to 17.

The camera has drain holes 51h formed in a barrier cover 51 for draining. The outer barrier cover 51 in front of the lens barrel LB has a plurality of small holes 51h (hereinafter referred to as drain holes) at the portion under an opening 51c for exposure of the lens. The opening 51c is opened/closed with the lens barrier 40 (hereinafter simply referred to as a barrier) as described above. The opening 51c is closed by four barrier blades so as to protect the photographic lenses.

The aforementioned drain holes 51h are formed in substantially the lowest portion of the outer barrier cover 51. As shown in the expanded view in FIG. 18, a barrier retraction space SP1 is communicated with an outside of the camera through the drain holes 51h. That is, the drain holes 51h are formed for the purpose of draining water droplets that reside in the lower portion of the barrier retraction space SP1 to the outside. Meanwhile, an air hole 52h is formed in the lowest portion of an inner barrier cover 52 at a position mostly opposite to the drain holes 51h. The barrier retraction space SP1 is communicated with the drive ring space SP2 through the air hole 52h.

Figure 19:
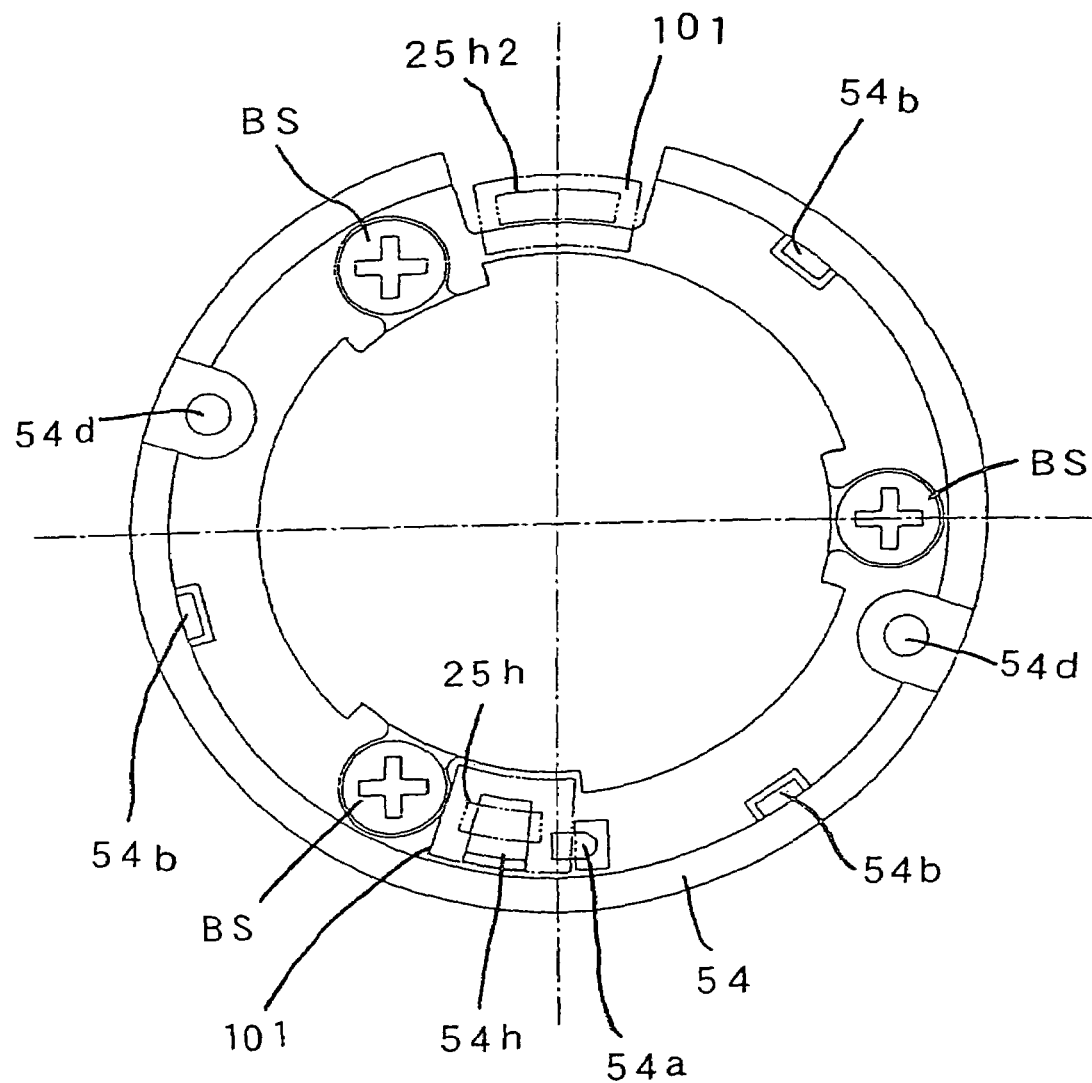
FIG. 19 shows a barrier drive ring holding member viewed from a front of an optical axis.

The barrier drive ring holding member 54 and the first-group cylinder 25 have air holes 54h and 25h at the lowest portions thereof, respectively. Those air holes 54h and 25h are partially overlapped with respect to the optical axis as shown in FIG. 19 representing the view of the barrier drive ring holding member 54 from the front of the optical axis. Accordingly the drive ring space SP2 is communicated with a rear space in the barrel (rear space of lens chamber) SP3 via the air holes 54h and 25h. The air hole 25h formed in the first-group cylinder 25 is tapered where its opening area is reduced as it approaches the front of the camera.

Referring to FIG. 19, a screw hole 54d is formed with which the outer barrier cover 51 is fixed, and a screw BS is used for fixing the barrier drive ring holding member 54 to the first-group cylinder 25.

The air holes 52h, 54h, 25h and the space SP2 formed in the respective members constitute an air passage through which the communication between the barrier retraction space SP1 and the rear space SP3 in the barrel is made. The air passage is formed at a position mostly opposite to the drain holes 51h. The barrier covers 51, 52, the barrier drive ring holding member 54 and the first-group cylinder 25 are combined to constitute a single lens block or a barrier block BR that does not rotate about the optical axis. Accordingly each position of the air passage and the drain holes 51h formed in the block BR is kept unchanged irrespective of the operation state of the lens barrel.

In other words, the barrier block BR is provided near an inlet of the lens chamber so as to be movable along the optical axis and to hold the state of the lens barrier that can be opened and closed. The barrier block BR has the barrier retraction space SP1 formed therein for accommodating the lens barrier in the opened state. As the barrier block BR moves along the optical axis, the volume of the rear space within the lens chamber is changed.

As described above, the rear space SP3 in the lens barrel represents the space within the lens barrel, which is closer to the rear of the camera than the first-group lenses L1, that is, the lens block BR.

A tapered air hole 25h2 is formed in the upper portion of the first-group cylinder 25 as shown in FIG. 19, through which the communication between the rear space SP3 in the lens barrel and the drive ring space SP2 is made. The drive ring space SP2 is communicated with the barrier retraction space SP1 via a center opening of the inner barrier cover 52. That is, another air passage is formed in the upper portion of the lens barrel to communicate the barrier retraction space SP1 with the rear space SP3 in the lens barrel. A water repellent sheet 101 is fixed to the front surface of the first-group cylinder 25 so as to cover each end of the respective taper holes 25h and 25h2. The water repellent sheet 101 is generally formed of such material as a water repellent polyester (finished with silicone and fluoride) fiber as an air permeable material that repels water for the use in the closing material field.

The draining operation will be described hereinafter.

The aforementioned drip-proof rubber members 71 to 73 prevent water from entering into the lens barrel as least as possible. However, it may be the case that water enters into the barrier retraction space SP1 through the opening 51c upon opening of the barrier or during its opening/closing operation. Even if the barrier is closed, water may enter into the barrier retraction space SP1 through the gap between the barrier blade and the outer barrier cover 51 in the same way as descried above. The residual water in the barrier retraction space SP1 is drained through the drain hole 51h formed in the outer barrier cover 51. The surface tension of the water makes it difficult to let such water to be drained by itself unless the size of the drain hole 51h is increased to a certain degree. However, if the size of the drain hole 51h is increased, the characteristic with respect to the design is limited. Moreover it is difficult for the small sized lens barrel to further increase the size of the drain hole. Therefore, the hole 51*h* has to be limited to be extremely small. The residual water may be held in the camera unless it is forcedly drained by shaking of the camera by the user.

In the second embodiment, the air passage formed in the lens block BR (air holes 52*h*, 54*h*, 25*h* and space SP2) further facilitates the draining. When the lens barrel is retracted, the lens block BR moves backward to reduce the volume of the rear space SP3 in the lens barrel. At this moment, an air flow directed from the rear space SP3 to the barrier retraction space SP1 is generated as shown by an arrow in FIG. 18. As the air passage is formed at the lower portion of the lens block BR, the aforementioned air flow serves to force the residual water in the lower portion of the barrier retraction space SP1 to the outside through the drain holes 51*h*. Even if the size of the drain holes 51*h* is small, the residual water can be effectively drained outside without shaking of the camera by the user.

As the air hole 25*h* that partially constitutes the air passage has a tapered shape, the pressure of air that is fed forward through the air hole 25*h* becomes high, thus enhancing the draining performance. Additionally the formation of the tapered hole can be easily facilitated. As the water repellent sheet 101 is attached to the front end of the tapered hole 25*h*, the entrance of water backward of such water repellent sheet can be prevented as much as possible.

In the case where the camera is used in a heavy rain, which allows entrance of much water into the barrier retraction space SP1 to prevent the flow of air by blocking the air passage, it may be difficult to drain such water. In the second embodiment, the air flow directed from the rear space SP3 in the lens barrel to the drive ring space SP2 is generated in the tapered hole 25*h*2 formed in the upper portion of the first-group cylinder 25. Such air flow serves to force the water in the barrier retraction space SP1 to the outside. Accordingly draining of the water in the barrier retraction space SP1 and the lower air passage may be facilitated. As the water repellent sheet 101 is attached to the end of the hole 25*h*2, entrance of water backward may be prevented as much as possible as aforementioned.

Figure 18:
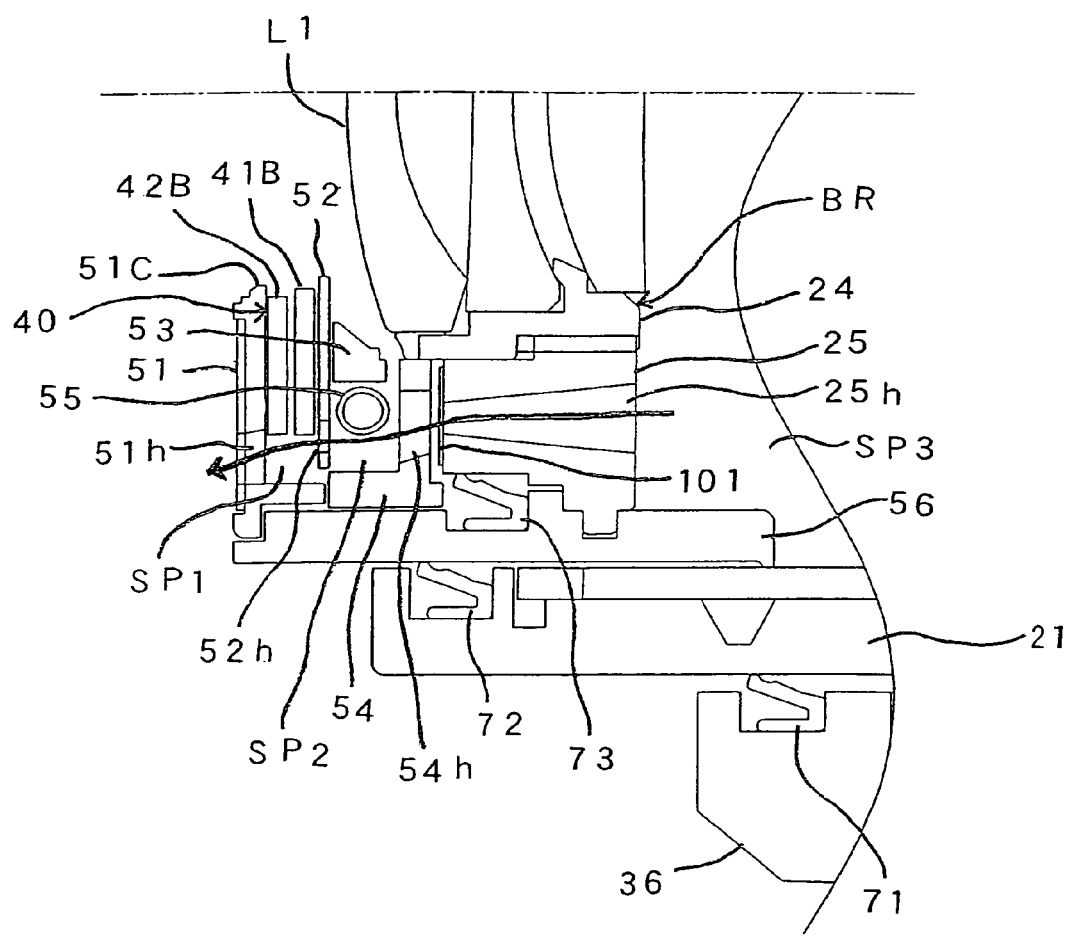
FIG. 18 is an expanded view that represents a portion located near a drain hole and an air hole as shown in FIG. 14.

In the second embodiment, the bias spring 55 is provided in the middle of the air passage so as to rotate the barrier drive ring 53 as shown in FIG. 18. The bias spring 55 formed of a metal is likely to be rusted by water. However, air flowing through the air passage is expected to dry the spring 55 so as to be protected from being rusted.

Figure 20:
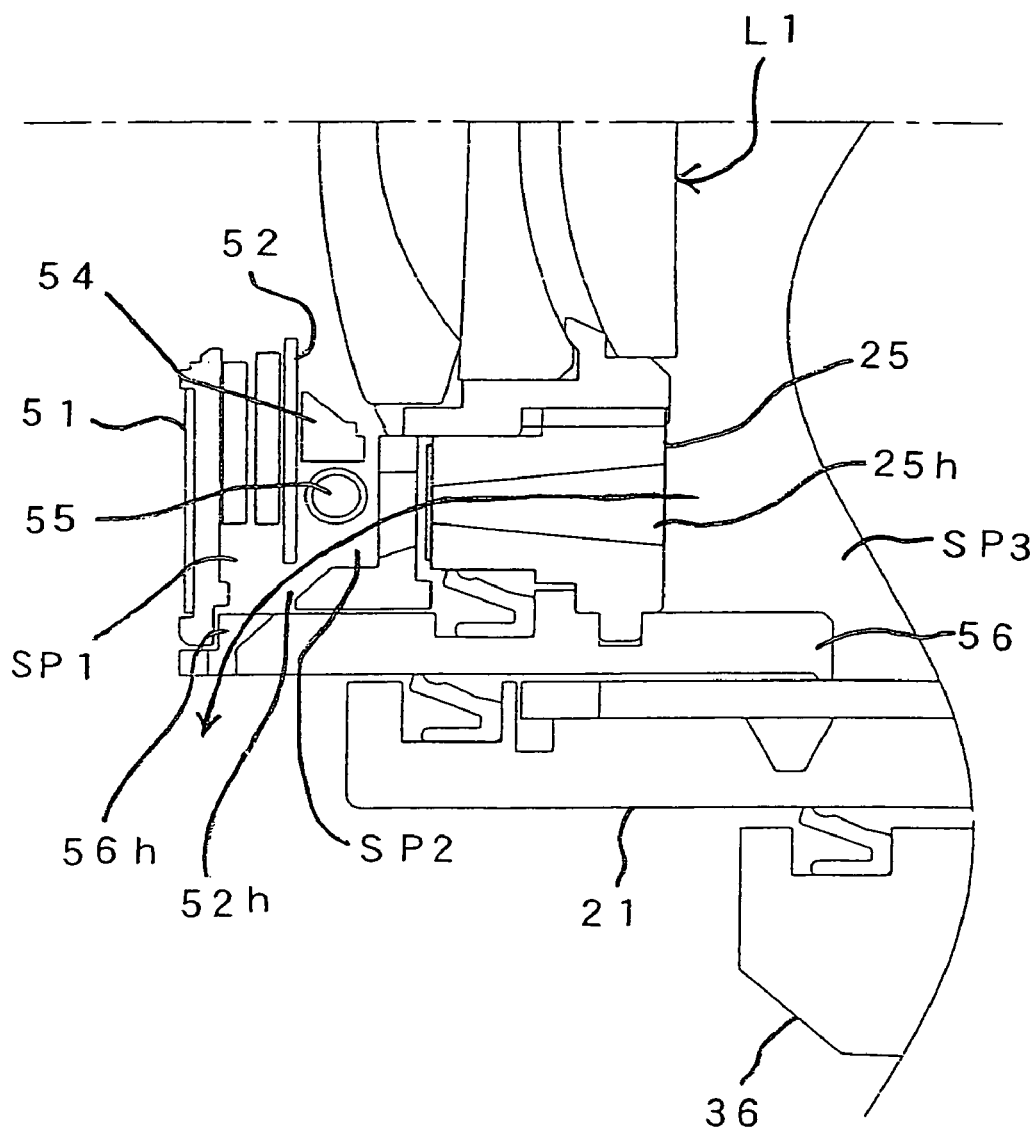
FIG. 20 is a view corresponding to FIG. 18, which represents a modified example of the second embodiment.

FIG. 20 shows a modified example of the second embodiment. The same elements that exhibit the same functions as those in the first embodiment will be designated with the same reference numerals. In this example, the drain holes 56*h* are formed in the lower-end portion of the peripheral surface of the barrier drive cylinder 56 instead of the barrier cover, that is, the portion corresponding to the bottom of the barrier retraction space SP1 for drainage. In this case, as the air passage formed of the air holes 52*h*, 54*h*, 25*h* and the space SP2 is formed in the vicinity of the drain holes 56*h*, the air flow may facilitate the drain operation effectively as aforementioned.

The barrier drive cylinder 56 as a constituent of the lens block BR rotates about the optical axis relative to the other elements such as the barrier covers 51, 52, the barrier drive ring holding member 54 and the first-group cylinder 25. As the rotational angle of the barrier drive cylinder 56 is substantially small, the position of the drain holes is hardly changed, which does not influence the draining operation. In this example, the holes 56*h* are required to be formed forward of the end of the cam cylinder 21 even if the lens barrel is in the most retracted position so as to prevent the water drained through the holes 56*h* from dropping into the lens barrel.

In the aforementioned example, air holes that constitute the air passage are formed in the barrier drive ring holding member 54 and the first-group cylinder 25. The member in which the air holes are formed may be changed depending on the structure of the barrier block. The air passage for communicating the barrier retraction space with the rear space in the lens barrel may be made so long as it is located close to the drain holes.

In the camera according to the first and the second embodiments, the lens is moved into the retracted position when it is not used, and the lens is brought into the "wide" end as the shooting position when the power is turned on. Thereafter, the lens is set to an arbitrary position between the "wide" end and the "tele" end depending on the zoom operation. The invention, however, may be applied to the camera in which the lens is not driven into the retracted position when it is not used, that is, the lens is constantly positioned at the shooting position, or the single focus camera. In this case, when the power is turned on, the barrier drive cylinder is rotated without driving the lens so as to release the barrier. This operation may be easily performed by providing the barrier drive cam to, for example, the cam cylinder. If the zoom lens barrel is employed in the camera, the zoom motor can be used as the drive source for operating the barrier.

The invention may be applied to the camera in which the lens is moved backward and forward between the "wide" end and the "tele" end rather than retracting, or to the single focus camera. The embodiments of the invention have been described with respect to the digital camera, however, it is applicable to the silver halide camera.

The invention may be formed as a camera provided with combined features of the first and the second embodiments.

It is to be understood that the invention is not limited to the lens barrel or the camera that have been described in detail in the embodiments but applicable to the lens barrel and the camera in which the elements equivalent to those described are replaced.

What is claimed is:

1. A lens barrel comprising:
   lenses provided in a lens chamber within the lens barrel;
   a lens barrier that is opened and closed in front of the lenses; and
   a barrier block that is provided near an inlet of the lens chamber so as to be movable along an optical axis, is capable of holding the lens barrier in an open state and a closed state, comprises a barrier retraction space where the lens barrier in the opened state is received, and changes a volume of a rear portion of the lens chamber according to a movement of the barrier block along the optical axis, wherein:
   the barrier block has a drain hole which communicates the barrier retraction space with an outside of the lens barrel, and an air passage formed near the drain hole which communicates the barrier retraction space with the rear portion of the lens chamber, such that an air flow directed from the rear portion of the lens chamber toward the barrier retraction space is generated in the air passage when the barrier block moves backward.

2. The lens barrel according to claim 1, wherein:
   the barrier unit includes at least a part of the lenses and a holding member thereof; and
   a part of the air passage is an air hole formed in the holding member.

3. The lens barrel according to claim 1, wherein a metal function member within the lens barrel is disposed in the air passage.

4. The lens barrel according to claim 1, wherein the air passage is sealed with a gas permeable water-repellent sheet.

5. The lens barrel according to claim 1, wherein a plurality of the air passages are formed in the barrier block.

6. The lens barrel according to claim 1, wherein:
a metal function member within the lens barrel is disposed in the air passage;
the air passage is sealed with a gas permeable water-repellent sheet and
a plurality of the air passages are formed in the barrier block.

7. A camera comprising the lens barrel according to claim 1.

8. A lens barrel comprising:
a lens provided in a lens chamber within the lens barrel;
a lens barrier that is opened and closed in front of the lens;
a barrier drive cylinder provided on an outer peripheral side of the lens so as to be allowed to rotate about an optical axis relative to a member provided on an inner peripheral side of the barrier drive cylinder;
a first link mechanism that rotates the barrier drive cylinder;
a second link mechanism that opens and closes the lens barrier interlocking with a rotation of the barrier drive cylinder;
an annular seal member that is provided into a space between the barrier drive cylinder and the member provided on the inner peripheral side over an entire circumference; and
a barrier block that is provided near an inlet of the lens chamber so as to be movable along an optical axis, is capable of holding the lens barrier in an open state and a closed state, comprises a barrier retraction space where the lens barrier in the opened state is received, and changes a volume of a rear portion of the lens chamber according to a movement of the barrier block along the optical axis, wherein:
the barrier block has a drain hole which communicates the barrier retraction space with an outside of the lens barrel, and an air passage formed near the drain hole which communicates the barrier retraction space with the rear portion of the lens chamber, such that an air flow directed from the rear portion of the lens chamber toward the barrier retraction space is generated in the air passage upon when the barrier block moves backward.

9. A camera comprising the lens barrel according to claim 8.

* * * * *